US006917910B2

(12) United States Patent
Itoh et al.

(10) Patent No.: US 6,917,910 B2
(45) Date of Patent: Jul. 12, 2005

(54) METHOD, APPARATUS, COMPUTER SYSTEM AND STORAGE MEDIUM FOR SPEECH RECOGNITION

(75) Inventors: Nobuyasu Itoh, Yokohama (JP); Masafumi Nishimura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 09/748,542

(22) Filed: Dec. 26, 2000

(65) Prior Publication Data

US 2001/0014859 A1 Aug. 16, 2001

(30) Foreign Application Priority Data

Dec. 27, 1999 (JP) .......................... 11-370413

(51) Int. Cl.[7] ............................. G10L 15/00
(52) U.S. Cl. .................. 704/200; 704/231; 704/235
(58) Field of Search ............... 704/231, 235, 704/244, 256, 257

(56) References Cited

U.S. PATENT DOCUMENTS

| | | | | |
|---|---|---|---|---|
| 5,261,009 A | * | 11/1993 | Bokser ........................ | 382/230 |
| 5,797,123 A | * | 8/1998 | Chou et al. .................. | 704/256 |
| 6,018,708 A | * | 1/2000 | Dahan et al. ................ | 704/244 |
| 6,125,345 A | * | 9/2000 | Modi et al. .................. | 704/240 |
| 6,212,498 B1 | * | 4/2001 | Sherwood et al. ........... | 704/244 |
| 6,292,778 B1 | * | 9/2001 | Sukkar ........................ | 704/256 |
| 6,314,399 B1 | * | 11/2001 | Deligne et al. ............. | 704/257 |
| 6,374,217 B1 | * | 4/2002 | Bellegarda ................... | 704/240 |
| 6,385,579 B1 | * | 5/2002 | Padmanabhan et al. ..... | 704/243 |
| 6,718,303 B2 | * | 4/2004 | Tang et al. .................. | 704/235 |
| 2002/0069055 A1 | * | 6/2002 | Tang et al. .................. | 704/235 |
| 2003/0093272 A1 | * | 5/2003 | Soufflet et al. .............. | 704/231 |

FOREIGN PATENT DOCUMENTS

| | | | |
|---|---|---|---|
| JP | 61-52698 | 3/1986 | ............. G10L/3/00 |
| JP | 06-027985 | 2/1994 | ............. G10L/3/00 |
| JP | 07-104782 | 4/1995 | ............. G10L/3/00 |

OTHER PUBLICATIONS

L.R. Bahl, et al., IEEE Trans., *A Maximum Likelihood Approach to Continuous Speech Recognition*, vol. PAMI–5, No. 2, (Mar. 1983).

Nishimura, et al., *Information Processing Society of Japan, Word–Based Approach to Large–Vocabulary Continuous Speech Recognition for Japanese*, vol. 40, No. 4, (Apr. 1999).

Kai et al., *Information Processing Society of Japan, Dealing with Out–of–Vacabulary Words and Filled Pauses in Word N–Gram Based Speech Recognition System*, vol. 40, No. 4, (Apr. 1999).

(Continued)

*Primary Examiner*—David L. Ometz
*Assistant Examiner*—Michael N Opsasnick
(74) *Attorney, Agent, or Firm*—Akerman Senterfitt

(57) ABSTRACT

The present invention provides a method and apparatus for speech recognition. The apparatus of the invention can include an acoustic processor. The acoustic processor can convert analog speech input signals into digital signals. Also included can be a first storage structure which can store an acoustic model which has learned voice characteristics. A second storage structure which can store a dictionary containing a first language model which has been trained regarding disfluency words and non-disfluency words, and a second language model which has been trained regarding non-disfluency words and trained to ignore disfluency words can be included. Additionally, the apparatus of the invention can include a probability calculator which can calculate a probability regarding the digital signals using the acoustic model and the dictionary to recognize words showing the highest probability of representing the input signals.

25 Claims, 5 Drawing Sheets

OTHER PUBLICATIONS

Nishimura, et al., *Proceeding of the Fall Meeting of the Acoustical Society of Japan, A Study on Broadcast News Transcription,* (1998).

A. Stolcke, et al., *Proc. of ICASSP96, Statistical Language Modeling for Speech Disfluencies.*

Okanobori, et al., *Keyword Spotting From Spoken Dialog Using Newspaper Language Model,* Tsukuba University, The Acoustical Society of Japan Spring Research Meeting Lecture Thesises Journal, 3–6–18, pp. 117–118, (Mar. 17, 1998).

Sakamoto, et al., *Speech Recognition Using Dialog–Conditioned Stochastic Language Model,* ATR Interpreting Telecommunications Research Labs, The Acoustical Society of Japan Spring Research Meeting Lecture Thesises Journal, 1–Q–24, pp. 157–158, (Mar. 23, 1994).

Kawahara, et al., *Task–Independent and Speaking–Style–Dependent Filler Model for Key–Phrase Detection and Verification,* Kyoto University, The Acoustical Society of Japan Spring Research Meeting Lecture Thesises Journal, 1–6–18, pp. 39–40, (Mar. 17, 1998).

Kawahara, et al., *Assessment of Domain–Independent Filler Model for Voice–Controlled Projector,* The Acoustical Society of Japan Spring Research Meeting Lecture Thesises Journal, 1–1–12, pp. 23–24, (Sep. 24, 1998).

Kawahara, et al., *Domain–Independent Filler Language Model Trained With Multiple Corpora,* The Acoustical Society of Japan Spring Research Meeting Lecture Thesises Journal, 3–Q–22, pp. 161–162, (Mar. 10, 1999).

Aoyama, *Word Spotting Speech Recognition,* Nihon Fuzzy Gakkaishi, Journal of Japan Society for Fuzzy Theory and Systems, vol. 11, No. 3, pp. 403–407, (Jun. 15, 1999).

Murakami, et al., *A Spontaneous Speech Recognition Algorithm With Pause and Filled Pause Procedure,* ATR Interpreting Telecommunications Research Labs, The Acoustical Society of Japan Spring Research Meeting Lecture Thesises Journal, 2–Q–22, pp. 191–192, (Oct. 5, 1993).

Murakami, et al., *A Spontaneous Speech Recognition Algorithm With Pause and Filled Pause Procedure,* Technical Report of IEICE, SP93–127, pp. 71–78, (Jan. 20, 1994).

Nagata, *Lexical Acquisition From Japanese Based On Statistical Unknown Word Model and Expected Word Frequency,* ISPJ Journal, vol. 40, No. 9, pp. 3373–3386, (Sep. 15, 1999).

* cited by examiner (a)　　　　　　　　　(b)

US 6,917,910 B2

METHOD, APPARATUS, COMPUTER SYSTEM AND STORAGE MEDIUM FOR SPEECH RECOGNITION

CROSS REFERENCE TO RELATED APPLICATIONS

This application claims the benefit of Japanese Application 11-370413, filed Dec. 27, 1999.

STATEMENT REGARDING FEDERALLY SPONSORED RESEARCH OR DEVELOPMENT (Not Applicable)

BACKGROUND OF THE INVENTION

1. Technical Field

The present invention relates to a method and apparatus for speech recognition and, more specifically, a method and apparatus for speech recognition to recognize natural human speech in a text form and prepare text data after automatically screening out meaningless words called disfluencies.

2. Description of the Related Art

Statistical methods for recognizing speech using acoustic models and language models have been known in the art. Examples of such methods are described in papers such as "A Maximum Likelihood Approach to Continuous Speech Recognition" (L. R. Bahl et al., IEEE Trans. Vol. PAMI-5, No. 2, March 1983) and "Word-based approach to large-vocabulary continuous speech recognition for Japanese" (Nishimura et al., Information Processing Society of Japan, Vol. 40, No. 4, April 1999). Briefly, those methods can include generating and speaking a text or word sequence, which can be referred to as W. The speech can be processed by an acoustic processor into a series of signals, from which a feature of the speech, which can be referred to as X, can be extracted. A recognition result, which can be referred to as W', can be determined or outputted as the most suitable result based on the expression below, as well as the feature X and the text W. Thus the text can be constructed. The expression (Expression 1) being:

$$W' = \underset{w}{\mathrm{argmax}}\, P(W|X) = \underset{w}{\mathrm{argmax}}\, \underbrace{P(W)}_{\text{Language model}}\underbrace{P(X|W)}_{\text{Acoustic Model}}$$

Namely, a probability $P(X|W)$ of said feature (X) when a word sequence W is spoken can be multiplied by a probability of W itself ($P(W)$). The word sequence W' which makes the multiplication product the largest (argmax) can be selected as a recognition result.

Acoustic models can be used for calculating the former probability $P(X|W)$, and the words which make this probability large enough can be selected as candidates for the recognition results. On the other hand, what often can be used for approximating the latter probability $P(W)$ can be language models, more specifically, N-gram models. This is a method for approximating the appearance probability of an entire text or a word sequence W, based on probability of a group of consecutive N (integer) words. The method can be expressed in the form of the following expression (Expression 2):

$$P(W) = P(w_0)P(w_1|w_0)P(w_2|w_0w_1)x,\ldots,$$

$$P(w_n|w_0,w_1,\ldots,w_{n-1}) \cong P(w_0)P(w_1|w_0)\prod_{i=2}^{n}P(w_i|w_{i-2},w_{i-1})$$

It is supposed in this expression that the probability of a word $w[n]$ depends only on N−1 (integer) words immediately preceding the word in question. The value of N can be varied, but N=3 is often used through a trade-off between effectiveness of the model and the size of data required for learning. Expression 2 shows the case of N=3, as well.

For example, if the n-th word of a text W consisting of n (integer) words is hereafter expressed as $w[n]$, then the probability of a word sequence W can be calculated as a multiplication product of all the probabilities of the appearance of the word $w[n]$ under a condition of N−1 (namely 2) words, that is, $P(w[n]|w[n-2],w[n-1])$. Here, in the expression at the left of "|" ($w[n]$) indicates the object word of recognition. ($w[n-2],w[n-1]$) at the right of "|" indicates 2 words immediately prior to the object word, which constitute a condition for predicting the word $w[n]$. The conditional probability $P(w[n]|w[n-2],w[n-1])$ for each of various words $w[n]$ can be learned through studies of text data prepared separately and stored as a database in the form of a dictionary. For example, the probability of the word "word" appearing at the beginning of a text can be 0.0021; and, the probability of the word "search" coming immediately after the word "word" can be 0.001, and so on.

The above N-gram model can be good enough for the recognition of speech read from a prepared text, but written copies are rarely given in areas where speech recognition is applied. More important than recognition of speech read from prepared texts, however, can be the application of the technique to recognize spontaneous speech. In such cases, normal words having semantic contents or meanings, in addition to interjectory expressions including "well" and "you know", and meaningless words such as "um" and "er" can be pronounced. These words can be called unnecessary words, disfluencies, or disfluency words. Accordingly, an N-gram model capable of dealing with disfluencies for automatically screening them out can be beneficial to a speech recognition system.

Conventional extensions of the N-gram model proposed for the above purpose have utilized a concept referred to as "transparent word." Some of those proposed extensions are described in reports such as "Dealing with Out-of-vocabulary Words and Filled Pauses in Word N-gram Based Speech Recognition System" (Kai et al., Information Processing Society of Japan, Vol. 40, No. 4, April 1999) and "A Study on Broadcast News Transcription" (Nishimura, Ito, Proceeding of the Fall Meeting of the Acoustical Society of Japan, 1998). In the extension models described in the former reports, for example, probability calculations can be made ignoring the existence of disfluencies, either during learning, which can be referred to a training, or recognition. The calculations can be made on an assumption that disfluencies appear comparatively freely between phrases and hence N-grams. This assumption can be a constraint on co-occurrence and, thus, cannot be expected to work effectively. For example, when a word $w[n-1]$ is a disfluency, rather than calculating the probability $w[n]$ as $P(w[n]|w[n-2],w[n-1])$, the probability of a word $w[n]$ can be estimated as $P(w[n]|w[n-3],w[n-2])$ ignoring $w[n-1]$. In this case, the disfluency, which is the word ignored or skipped, is called a "transparent word." Probabilities can be calculated in this model on an assumption that disfluencies appear between non-disfluency words (normal words) with an equal probability.

Some reports say, however, that the assumption to the effect that disfluencies actually carry no information and appear freely between normal words is not true in the English language. For example, in a paper titled "Statistical Language Modeling for Speech Disfluencies" (A. Stolcke, E. Shriberg, Proc. of ICASSP96), it is stated that, as a result of an application of a common N-gram to disfluencies, accuracy of predicting a word succeeding a disfluency was improved as compared with the transparent word model. Nevertheless, since the nature of a disfluency can be empirically different from that of a normal word, as is clear from the above explanation of the transparent word, other solutions can yield more accurate results than modeling word sequences including disfluencies as a simple sequential series.

Conventional speech recognition systems commonly used for dictation purposes, on the other hand, often employ a method of interpolation between two or more different language models. This technique can be used when a general purpose model serving as a base model cannot effectively deal with texts peculiar to a specific field of activities such as computer, sports, and so on. In such a case, a language model of a specific field of activities, having learned about texts peculiar to the field in question, can be employed in combination with the language model for general purposes. Using this approach, the probability calculation can be performed as follows:

$$PR(w[n]|w[n-2],w[n-1]) = f\acute{E}P1(w[n]|w[n-2],w[n-1]) + (1-f\acute{E})P2(w[n]|w[n-2],w[n-1])$$

where P1 indicates a general purpose language model, P2 indicates a language model of a specific field, and fÉ is an interpolation coefficient, which can be set at an optimum value through experimentation.

SUMMARY OF THE INVENTION

The invention can provide a method and apparatus for speech recognition having a higher recognition accuracy than conventional similar arts. Notably, word prediction accuracy can be enhanced in text portions near unnecessary words or disfluencies.

The present invention can enhance word prediction accuracy in text portions near disfluencies. This can be accomplished through the distinction of words between disfluencies and non-disfluency words. Further, interpolation methods can be applied to word sequences containing disfluencies in different ways depending on the distinction in the words to be predicted or the preceding words constituting a condition for the prediction.

More specifically, apparatus of the invention can provide an acoustic processor which can convert analog speech input signals into digital signals. A first storage structure which can store an acoustic model which has learned voice characteristics also can be included. A second storage structure which can store a dictionary containing a first language model which has been trained regarding disfluency words and non-disfluency words, and a second language model which has been trained regarding non-disfluency words and trained to ignore disfluency words can be included. Notably, the first and second language models can be N-gram models. Also included can be a probability calculator which can calculate a probability regarding the digital signals using the acoustic model and the dictionary to recognize words showing the highest probability of representing the input signals.

Another aspect of the invention can be a computer system including an input receiver which can input analog speech. Also included can be a processing converter which can convert the analog speech into digital signals and a first storage structure which can store an acoustic model which has learned voice characteristics. The system further can include a second storage structure which can store a dictionary containing a first language model which has been trained regarding disfluency words and non-disfluency words, and a second language model which has been trained regarding non-disfluency words and trained to ignore disfluency words. Notably, the first and second language models can be N-gram models. A probability calculator which can calculate a probability regarding the digital signals using the acoustic model and the dictionary to recognize words showing the highest probability of representing the analog speech can be included. Additionally, a display apparatus for displaying results of the recognition can be included.

Another aspect of the invention can be a method for speech recognition including a series of steps. The steps can include converting analog speech input signals into digital signals. Also included can be the step of storing a dictionary containing a first language model which has been trained regarding disfluency words and non-disfluency words, and a second language model which has been trained regarding non-disfluency words and trained to ignore disfluency words. Notably, the first and second language models can be N-gram models. The step of calculating a probability regarding the digital signals using the acoustic model and the dictionary to recognize words showing the highest probability of representing the input signals also can be included.

Another embodiment of the invention can be a method for speech recognition including a series of steps. The steps can include receiving analog speech input and converting the analog speech into digital signals. The step of storing a dictionary containing a first language model which has been trained regarding disfluency words and non-disfluency words, and a second language model which has been trained regarding non-disfluency words and trained to ignore disfluency words can be included. Notably, the first and second language models can be N-gram models. Also included can be the step of calculating a probability regarding the digital signals using the acoustic model and the dictionary to recognize words showing the highest probability of representing the speech input. Additionally, the step of displaying results of the recognition can be included.

Another aspect of the invention can be a storage medium readable by a computer containing a computer program. The storage medium can store an acoustic model and a dictionary containing a first language model which has been trained regarding disfluency words and non-disfluency words, and a second language model which has been trained regarding non-disfluency words and trained to ignore disfluency words. Notably, the first and second language models can be N-gram models. The computer program can be designed to calculate a probability regarding digital signals converted from analog speech signals inputted into the computer using the dictionary to recognize words showing the highest probability of representing the analog speech signals.

Another embodiment of the invention can be a storage medium for storing a dictionary comprising a first language model which has been trained regarding disfluency words and non-disfluency words, and a second language model which has been trained regarding non-disfluency words and trained to ignore disfluency words. Notably, the first and second language models can be N-gram models.

Another aspect of the invention ca be an apparatus for recognizing speech from texts comprising disfluency words and non-disfluency words. The apparatus can include a first judging processor which can judge whether words inputted as an object of recognition are non-disfluency words. A second judging processor which can judge whether the inputted words constituting a condition necessary for recognizing the inputted words consist of only non-disfluency words, if the inputted words have been judged to be non-disfluency words by the first judging processor can be included. Also, a first probability calculator which can calculate a probability, if the conditional words have been judged as containing non-disfluency words and disfluency words by the second judging processor, by using a dictionary containing a first language model which has been trained regarding disfluency words and non-disfluency words, and a second language model which has been trained regarding non-disfluency words and trained to ignore disfluency words so as to recognize words showing the highest probability of representing the inputted words can be included.

The first probability calculator can contain a third judging processor which can judge whether a word immediately preceding the object word is a disfluency word. Also included in the first probability calculator can be a fourth probability calculator. The fourth probability calculator can calculate the probability based on the first and the second language models, if the preceding word has been judged to be a disfluency word by the third judging processor.

A second probability calculator can also be included. The second probability calculator can calculate the probability based on the first language model, if the object words have been judged as not being non-disfluency words by the first judging processor. Also included can be a third probability calculator. The third probability calculator can calculate probability based on the second language model, if the conditional words have been judged as containing only non-disfluency words by the second judging processor.

The apparatus further can contain a fifth probability calculator. The fifth probability calculator can contain calculate the probability based on the second language model, if the preceding word has been judged as not being a disfluency word by the third judging processor.

Another aspect of the invention can be a method for recognizing speech from texts comprising disfluency words and non-disfluency words. The method can include the steps of (a) judging whether words inputted as an object of recognition are non-disfluency words. If the object words have been judged as not being non-disfluency words in step (a), the method further can include the step of calculating the probability based on the first language model. The method can include the step of (b) judging further whether the words constituting a condition necessary for recognizing the input words consist only of non-disfluency words, if the inputted words have been judged to be non-disfluency words in step (a). If the conditional words have been judged as consisting only of non-disfluency words in step (b), the step of calculating the probability based on the second language model can be included. The method also can include (c) calculating a probability, if the conditional words have been judged as comprising non-disfluency words and disfluency words in step (b), by using a dictionary containing a first language model which has been trained regarding disfluency words and non-disfluency words, and a second language model which has been trained regarding non-disfluency words and trained to ignore disfluency words so as to recognize words showing the highest probability of representing the input words. If the conditional words have been judged as consisting only of non-disfluency words in step (c), the method can include the step of calculating the probability based on the second language model.

Step (c) of the method further can include the steps of (d) judging whether a word immediately preceding the object word is a disfluency word and calculating the probability based on the first and the second language models, if the preceding word has been judged to be a disfluency word in step (d).

Also included in the method can be the step of calculating the probability based on the second language model, if the preceding word has been judged as not being a disfluency word in step (d).

Another aspect of the invention can be a storage medium readable by a computer containing a computer program to recognize speech from texts comprising disfluency words and non-disfluency words. The computer program can be designed to make the computer perform a series of steps. The steps can include (a) judging whether words inputted as an object of recognition are non-disfluency words. If the object words have been judged as not being non-disfluency words in step (a), the method can include calculating the probability based on the first language model. The step of (b) judging further whether the words constituting a condition necessary for recognizing the inputted words consist only of non-disfluency words, if the inputted words have been judged to be non-disfluency words in step (a) can be included. If the conditional words have been judged as consisting only of non-disfluency words in step (b), the step of calculating the probability based on the second language model can be included. Also included can be the step of (c) calculating a probability, if the conditional words have been judged as comprising non-disfluency words and disfluency words in step (b), by using a dictionary containing a first language model which has been trained regarding disfluency words and non-disfluency words and a second language model which has been trained regarding non-disfluency words and trained to ignore disfluency words so as to recognize words showing the highest probability of representing the inputted words.

The storage medium can cause the computer to perform the additional steps of (d) judging whether a word immediately preceding the object word is a disfluency word; and calculating the probability based on the first and the second language models, if the preceding word has been judged to be a disfluency word in step (d). The storage medium can cause the computer to perform the additional step of calculating the probability based on the second language model, if the preceding word has been judged as not being a disfluency word in step (d).

Another aspect of the invention can be an apparatus for speech recognition including an acoustic processing apparatus for converting analog speech input signals into digital signals and a first storage apparatus for storing an acoustic model which has learned voice characteristics. Also included can be a second storage apparatus for storing a dictionary comprising a first language model which has been trained regarding disfluency words and non-disfluency words, and a second language model which has been trained regarding non-disfluency words and trained to ignore disfluency words. Additionally an apparatus, connected with the acoustic processing apparatus and the first and second storage apparatuses, for calculating a probability regarding the digital signals using the acoustic models and the dictionary to recognize words showing the highest probability of representing the input signals can be included.

Another aspect of the invention can be a computer system including an input apparatus for inputting analog speech and a converting apparatus connected with the input apparatus for converting the analog speech into digital signals. Also included can be a first storage apparatus for storing an acoustic model which has learned voice characteristics. A second storage apparatus for storing a dictionary comprising a first language model which has been trained regarding disfluency words and non-disfluency words, and a second language model which has been trained regarding non-disfluency words and trained to ignore disfluency words also can be included. Additionally, an apparatus, connected with the converting apparatus and the first and second storage apparatuses, for calculating a probability regarding the digital signals using the acoustic model and the dictionary to recognize words showing the highest probability of representing the analog speech can be included. A display apparatus for displaying the results of the recognition further can be included.

BRIEF DESCRIPTION OF THE DRAWINGS

There are shown in the drawings, embodiments which are presently preferred, it being understood, however, that the invention is not so limited to the precise arrangements and instrumentalities shown, wherein.

DETAILED DESCRIPTION OF THE INVENTION

The present invention can enhance word prediction accuracy in text portions near disfluency words, also referred to as disfluencies, through distinction of words between disfluencies and normal non-disfluency words, which can be referred to as normal words. Disfluencies can be unnecessary words or normal words having semantic contents or meanings. Further, disfluencies can be interjectory expressions including "well" and "you know", as well as meaningless words such as "um" and "er". Word prediction accuracy further can be enhanced by applying the interpolation method to word sequences containing disfluencies in different ways depending on the distinction either in the words to be predicted or the preceding words constituting a condition for the prediction. Specific details are described hereafter.

Figure 1:
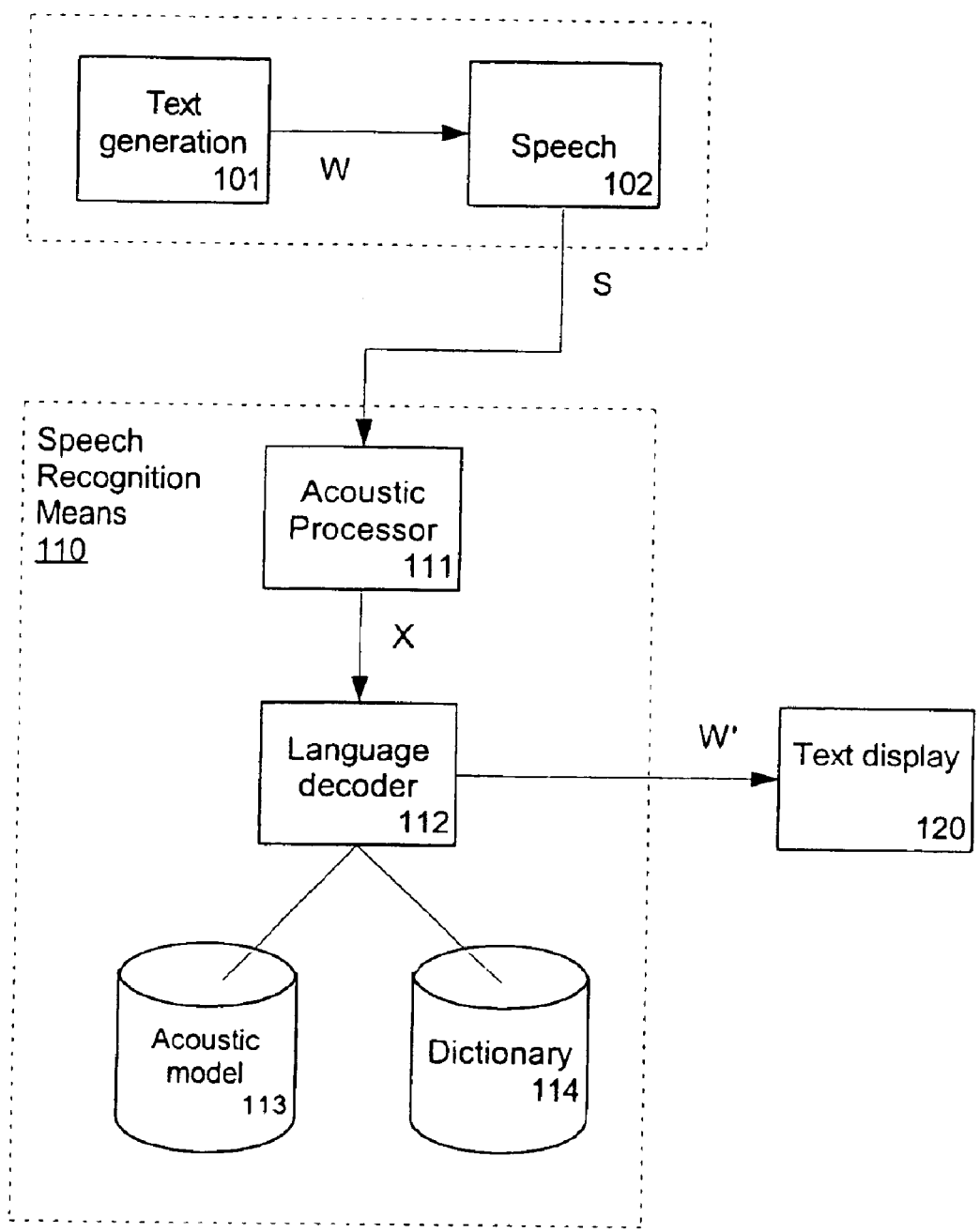
FIG. 1 is a block diagram showing an exemplary construction of the present invention.

FIG. 1 is a schematic diagram showing an exemplary construction of the present invention. A text, which can be referred to as W, generated in block 101 (namely, a real text) can be spoken. The resulting speech is depicted in block 102. Generally, a speaker causes the generation and speech of the text to take place. The resulting speech, referred to as S, can be a sequence of sound containing not only the text W, but also disfluencies, such as "well", "um", and so on. The input speech S can be converted by an acoustic processor 111 of a speech recognition means 110 into a series of signals, which can be referred to as X, and then stored. The converted signals X can be processed into a recognition result referred to as W' by a language decoder 112. This can be accomplished by extracting words deemed meaningful from a mixture of the real text and disfluencies. The recognition result can be obtained using an acoustic model 113 which can contain learned voice characteristics and a dictionary 114 of language models prepared beforehand through learning processes described hereinafter. Such a series of processing is sometimes called decoding of meaningful data from data encoded in the form of sound. Then, a text can be produced as the recognition result is displayed as depicted in block 120.

Figure 2:
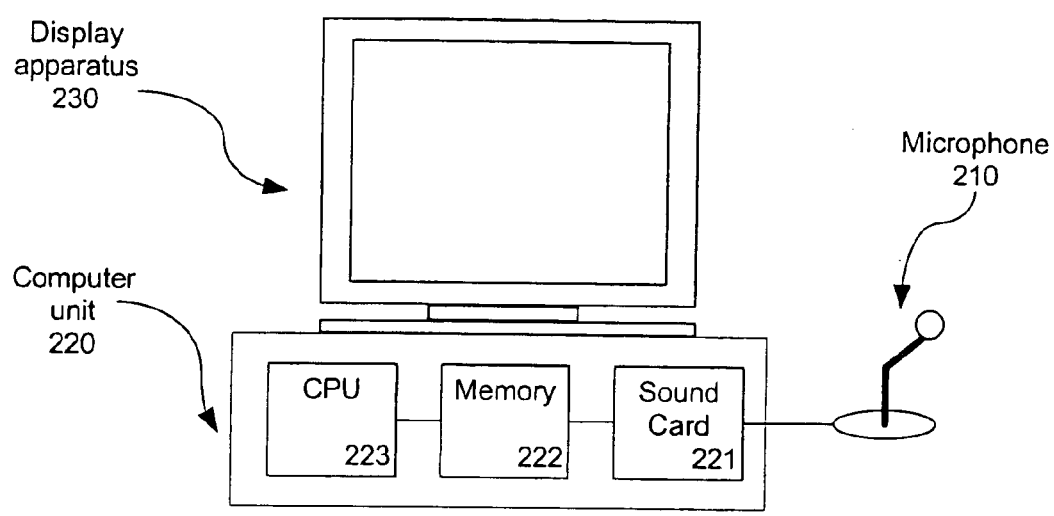
FIG. 2 is an illustration showing an exemplary computer system by which the present invention can be embodied.

FIG. 2 shows an example of a typical apparatus by which the present invention can be embodied. Speech spoken by a speaker can be input as analog signals through a microphone 210, converted into digital signals by a sound card 221, and stored in a memory 222. Notably, each component can exist as part of a computer unit 220. An acoustic model and a dictionary comprising the language models prepared through learning processes described hereinafter can be stored in memory 222. A CPU 223 carries out the language decoding from the converted and stored signals using the dictionary, and displays the recognition results on a display apparatus 230. Notably, the microphone can form a part of either the computer or the display apparatus, and, further, the recognition results can be printed out by a printer on sheets of paper instead of being shown on a display apparatus such as a cathode ray tube or a liquid crystal display. The various hardware requirements for the computer system as described herein can generally be satisfied by any one of many commercially available high speed multimedia personal computers offered by manufacturers such as International Business Machines Corporation.

It should be appreciated that the elements shown in the schematic diagram of FIG. 1 can correlate to the elements of the exemplary apparatus of FIG. 2. For example, former stages of the acoustic processor's functions can be realized by the microphone, the sound card, and the memory. The acoustic model and the dictionary (language models) can be stored in the memory. Later stages of the acoustic processor's functions and the language decoding can be performed using the CPU. Notably, the CPU can be required because the processing performed by the acoustic processor involves not only a simple conversion into digital signals, but also, processing such as extraction of the feature X. The display of the text can be done on the display apparatus. These relationships, however, need not be fixed. For example, a memory storing the converted signals and another storing the dictionary need not be physically the same one. In such a case it is possible to consider the separate memories as a single memory apparatus.

One of the peculiar characteristics of a disfluency word can be that, based on the information the disfluency word carries, the word's contribution to the prediction of succeeding words is unclear. Generally, the transparent word model, described as background art, can stand for the proposition that it is preferable to ignore disfluencies and use normal words preceding the ignored disfluencies for the purpose of predicting words. The basic idea of the normal (or typical) N-gram model, on the other hand, can be that the most useful piece of information for predicting a word is the word preceding it. Under this situation, the word prediction can be performed by preparing multiple language models based on the above two methods and interpolating between these models. Specific procedures of learning and calculation of probability take place as described hereafter. For the ease of explanation, N=3 (3-gram) is applied to all the explanations below.

Figure 3:
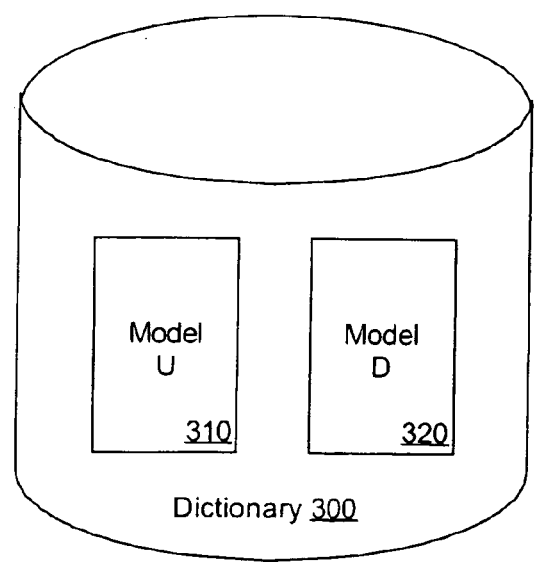
FIG. 3 is an illustration of an exemplary dictionary which can be employed in the present invention.

A dictionary 300, shown in FIG. 3, can be created through learning based on text data prepared beforehand. A dictionary based on two models can be created specifically in the manner described below. Note that in either model, when disfluencies appear in sequence, for instance, the sequence of disfluencies can be regarded as one during learning or training.

1. The 3-gram probability for normal words can be learned using learning text data consisting only of normal words where disfluencies can be eliminated. Namely, this model, Model U 310 in FIG. 3, can be a language model based on the idea of the transparent word model explained above.

2. Texts containing disfluencies can be learned. In that case, the following two cases can be included where "wfil" indicates a disfluency:

(1) The 3-gram probability in a case where the word to be predicted is a disfluency such as wfil, namely P(wfil|w[n−2],w[n−1]), can be learned. There can be a possibility, for example, that one of the predecessor words w[n−1] is a normal word and the other w[n−2] is a disfluency. In that case, w[n−2] can be skipped and w[n−3] can be taken into the condition. Thus, the learning object can become P(wfil|w[n−1],w[n−3]), that is, the condition can be changed not to contain disfluencies.

(2) The 2-gram probability P(w[n]|wfil), in a case where the word to be predicted is a normal word and the word preceding it is a disfluency, can be learned using only the disfluency as the condition. This can be the probability in a case where the word preceding a normal word is a disfluency.

The essence of these learning processes can be that, as stated above, learning of probabilities is done separately for disfluencies and normal words regarding either the words constituting the condition or the word to be predicted. The results of 2 (1) and (2) combined can form Model D 320 of FIG. 3.

Figure 4:
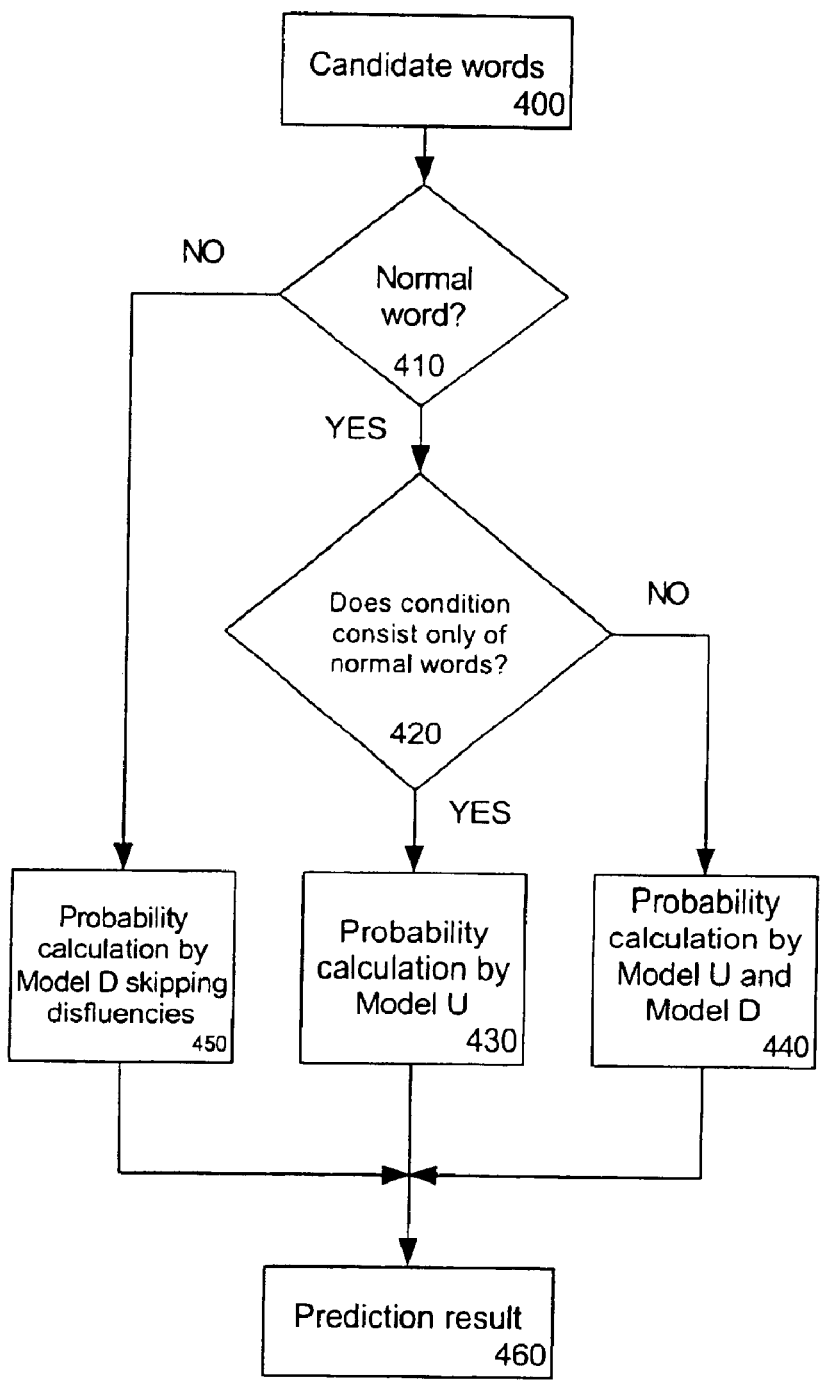
FIG. 4 is a flowchart illustrating exemplary processing procedures of the present invention.

A probability calculation for the recognition can be performed according to the flowchart shown in FIG. 4 using the dictionary prepared through the learning described above. Explanations are given hereafter regarding FIG. 4.

Words can be selected (400) as candidates for the recognition based on results of calculations using the acoustic model regarding the speech signals converted by the acoustic processor. At this stage, the number of the candidate words for recognition can be reduced to, for example, several hundreds. A judgment can be made (410) as to whether each of the candidate words is a normal word or a disfluency. The reason for this judgment is that, by the present invention, the probability calculation is different depending on whether the object word is a normal word or a disfluency.

In the case where a candidate word is a normal word w[n], whether the condition w[n−2],w[n−1] consists only of normal words can be examined (420). If the condition w[n−2], w[n−1] consists only of normal words, a prediction, namely a probability calculation, of w[n] can be carried out (430) from P(w[n]|w[n−2],w[n−1]) of Model U.

When the word to be recognized is a normal word w[n] but the condition is judged to contain a disfluency, the probability can be calculated using both Model U and Model D (440).

Figure 5:
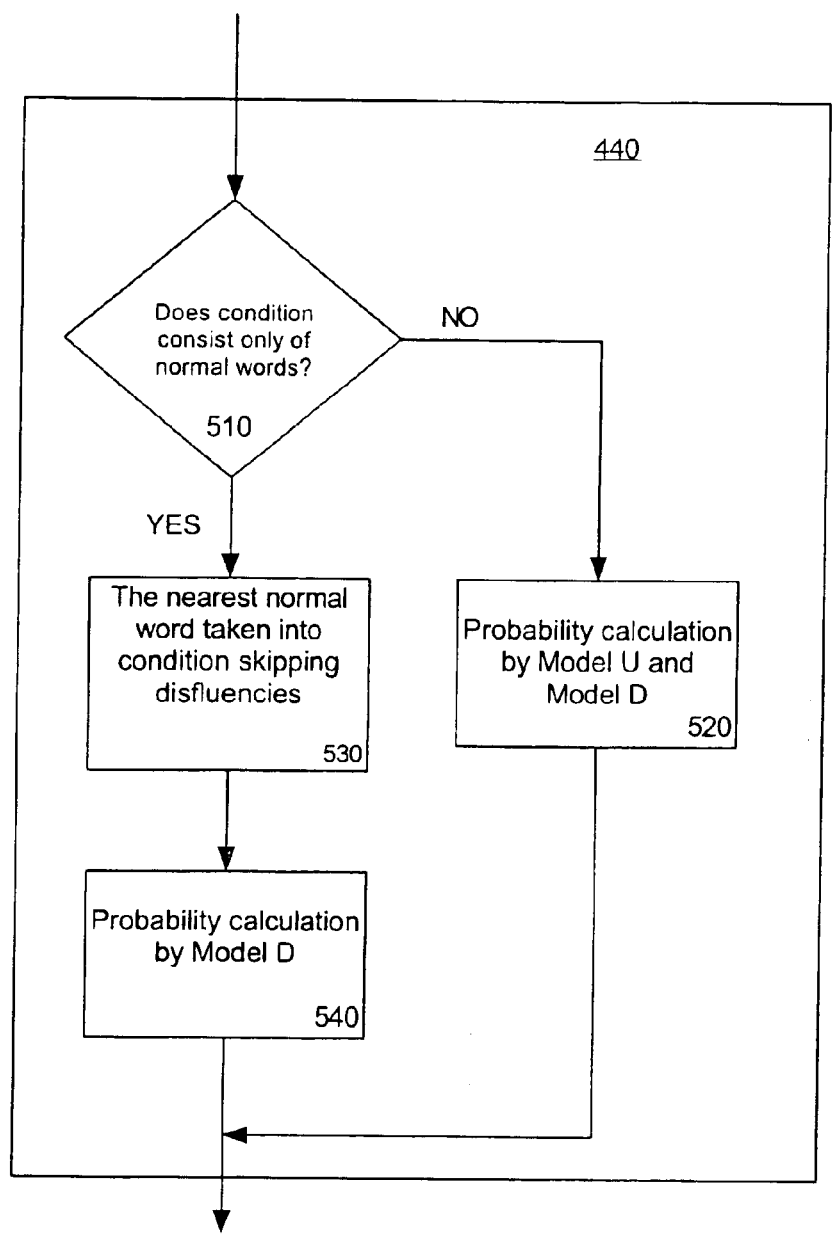
FIG. 5 is a flowchart illustrating exemplary processing procedures of the present invention.

Block 440 is explained in more detail hereafter based on the exemplary embodiment of FIG. 5. Regarding FIG. 5, when the word to be recognized is a normal word w[n], a judgment can be made as to whether there is any disfluency in the condition (510). If the word w[n−1] preceding the word to be recognized is a disfluency, it can be skipped. In that case, words can be searched backwards until a normal word is encountered. The probability of w[n] can be calculated (520) through an interpolation between a probability by Model U taking the encountered normal word into the condition, and a probability by Model D under a condition that the preceding word is a disfluency. In short, the probability in question Pr is calculated from the following expression: Pr=fÉPU(w[n]|w[n−2],w[n−1])+(1−fÉ)PD(w[n]|wfil) where PU is a probability by Model U, and PD a probability by Model D. fÉ is an interpolation coefficient to be set at an optimum value previously through experiments. For example, the value of the interpolation coefficient fÉ can be changed from 0 to 1 at an interval of 0.1 in a series of experiments. The value resulting in the highest recognition accuracy regarding speech data containing disfluencies can be used.

When a word to be recognized is a disfluency w[n] and the condition w[n−1],w[n−2] contains disfluencies, words can be searched backwards, skipping disfluencies, (530) until the first and the second normal words w[n−i], w[n−j] are encountered. Then the probability can be calculated (540) by Model D, PD(w[n]|w[n−i],w[n−j]), where the encountered two normal words can be taken into the condition.

Referring back to FIG. 4, based on the above result, the probability from the language models can be calculated (460) for the word to be predicted. The word showing the highest probability can be displayed as the recognized word or, otherwise, starting from the above prediction result, the number of the candidate words can be further reduced to a hundred or so. In the latter case, the calculation of probability by the acoustic model can be made in detail once again regarding the selected words for obtaining a recognition result.

As stated above, by the present invention, the effect of a normal word and a disfluency can be taken into consideration in more suitable proportions. This can be accomplished in the probability calculation through a distinction between a disfluency and a normal word either regarding the word to be predicted or those of the condition. Moreover, by utilizing separate learning according to the above distinction and interpolation between the two models in the probability calculation, the effects of a normal word and a disfluency further can be taken into consideration.

Setting the interpolation coefficient fÉ at an optimum value for obtaining good results by the present invention can be essential. Many factors can affect the value of fÉ, however, such as the appearance frequency of a disfluency, the size of the corpus to be learned, and so on. Such factors can make it difficult to theoretically examine their respective effects. The value of fÉ often can be determined, therefore, based on a value obtained through experiments indicating how effectively each of the language models is functioning.

A statistic called perplexity generally can be used for measuring effectiveness of a language model. Its detailed definition is described in papers such as "Digital Signal Processing for Speech Data" (Kano et al., Shokodo, 1997). Generally, perplexity can be an indicator of the degree to which the total size of a vocabulary for recognition can be reduced by use of a language model, for instance, from an original 60,000 words to an equivalent of such and such number of object words. The smaller the perplexity figure, the better the model.

In the case of a corpus containing about one million words prepared through transcription of TV lectures, for example, the optimum value of fÉ was 0.2. Perplexity was then calculated. Whereas the transparent word model showed a perplexity of 225.0, that of the model of the present invention was 195.1, an improvement of approximately 13%. This improvement ratio, as compared with various other improvement proposals in this field, not being limited to those related to disfluency, can be a significant one.

The present invention allows for various combined applications besides the above example. Such applications can include interpolation in predicting a disfluency, interpolating probability under a condition that two disfluencies appear in sequence, and applying the model D, for instance, where a disfluency is not used for the condition when the word preceding the word to be predicted is also a disfluency.

In the above example, Model D was formed through learning the case where the word preceding the object word was a disfluency. Also, in the interpolation, a probability of the case where the second word before the object word is a disfluency (3-gram model) can be taken into consideration.

Figure 6:
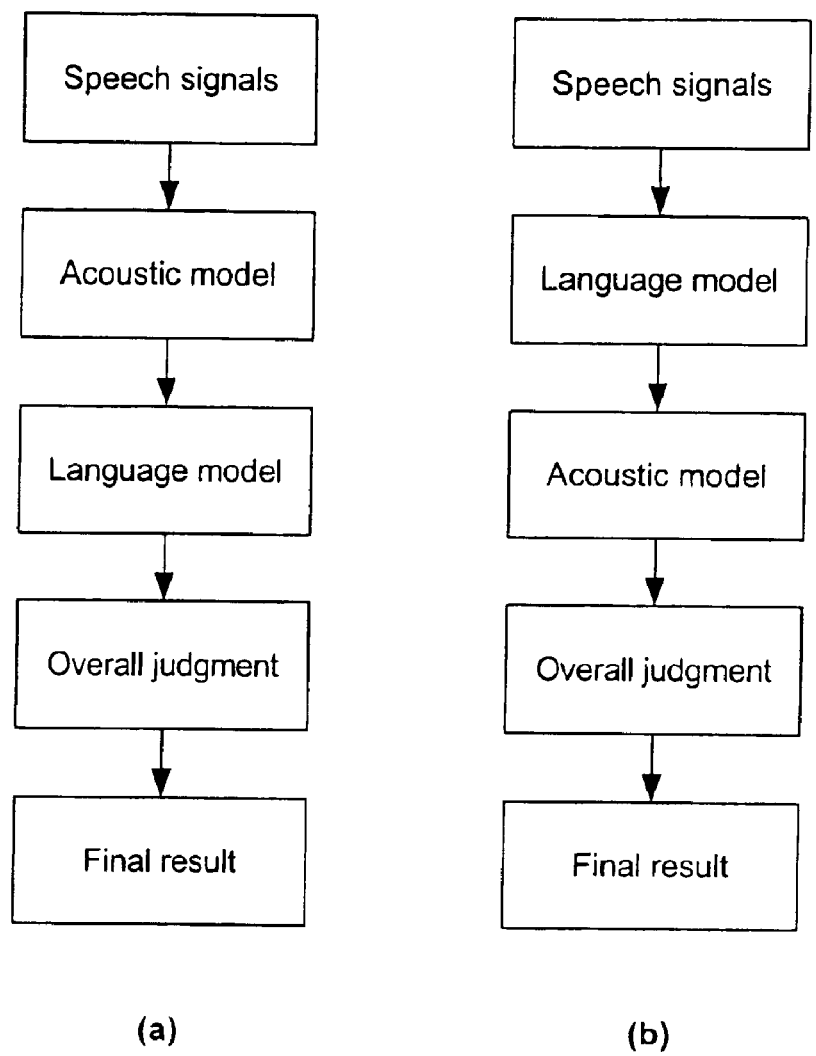
FIG. 6 is a flowchart illustrating exemplary processing procedures of speech recognition.

By the present invention, as described above and as shown in FIGS. 6(a) and 6(b), the final recognition result can be obtained regarding the speech signals converted by the acoustic processor in through a plurality of steps. These steps can include selecting words of a certain limited number as recognition candidates based on results of calculations first using the acoustic model. The language models then can be applied. Next, an overall judgment can be made through the calculation of probabilities of the candidate words (FIG. 6 (a)). An inverse procedure is also possible, that is, a certain reduced number of candidate words can be selected, first, using language models based on histories of the recognized words. Then, the recognition can be made applying the acoustic model to the candidate words (FIG. 6 (b)).

What is claimed is:

1. An apparatus for recognizing from texts comprising disfluency words and non-displuency words, said apparatus comprising:

a first judging processor, wherein said first judging processor judges whether words inputted as an object of recognition are non-disfluency words;

a second judging processor, wherein said second judging processor judges whether said inputted words constituting a condition necessary for recognizing said inputted words consist of only non-disfluency words, if said inputted words have been judged to be non-disfluency words by said first judging processor;

a first probability calculator, wherein said first probability calculator calculates a probability, if said conditional words have been judged as containing non-disfluency words and disfluency words by said second judging processor, by using a dictionary containing a first language model which has been trained regarding disfluency words and non-disfluency words, and a second language model which has been trained regarding non-disfluency words and trained to ignore disfluency words so as to recognize words showing the highest probability of representing said inputted words;

a second probability calculator, wherein said second probability calculator calculates said probability based on said first language model, if said object words have been judged as not being non-disfluency words by said first judging processor; and a third probability calculator, wherein said third probability calculator calculates said probability based on said second language model, if said conditional words have been judged as containing only non-disfluency words by said second judging processor.

2. An apparatus for recognizing speech from texts comprising disfluency words and non-disfluency words, said apparatus comprising:

a first judging processor, wherein said first judging processor judges whether words inputted as an object of recognition are non-disfluency words;

a second judging processor, wherein said second judging processor judges whether said inputted words constituting a condition necessary for recognizing said inputted words consist of only non-disfluency words, if said inputted words have been judged to be non-disfluency words by said first judging processor;

a first probability calculator, wherein said first probability calculator calculates a probability, if said conditional words have been judged as containing non-disfluency words and disfluency words by said second judging processor, by using a dictionary containing a first language model which has been trained regarding disfluency words and non-disfluency words, and a second language model which has been trained regarding non-disfluency words and trained to ignore disfluency words so as to recognize words and trained to ignore disfluency words so as to recognize words showing the highest probability of representing said inputted words;

a third judging processor, wherein said third judging processor judges whether a word immediately preceding said object word is a disfluency word; and a fourth probability calculator, wherein said fourth probability calculator calculates said probability based on said first and said second language models, if said preceding word has been judged a disfluency word by said third judging processor.

3. The apparatus for speech recognition according to claim 2, further comprising a fifth probability calculator, wherein said fifth probability calculator calculates said probability based on said second language model, if said preceding word has been judged as not being a disfluency word by said third judging processor.

4. The apparatus for speech recognition according to claim 2, said first probability calculator further comprising:

a second probability calculator, wherein said second probability calculator calculates said probability based on said first language model, if said object words have been judged as not being non-disfluency words by said first judging processor.

5. The apparatus for speech recognition according to claim 4, further comprising a fifth probability calculator, wherein said fifth probability calculator calculates said probability based on said second language model, if said preceding word has been judged as not being a disfluency word by said third judging processor.

6. The apparatus for speech recognition according to claim 4, further comprising:

a third probability calculator, wherein said third probability calculator calculates probability based on said second language model, if said conditional words have been judged as containing only non-disfluency words by said second judging processor.

7. The apparatus for speech recognition according to claim 6, further comprising a fifth probability calculator, wherein said fifth probability calculator calculates said probability based on said second language model, if said preceding word has been judged as not being a disfluency word by said third judging processor.

8. A method for recognizing speech from texts comprising disfluency words and non-disfluency words, comprising the steps of:

(a) judging whether words inputted as an object of recognition are non-disfluency words;

(b) judging further whether said words constituting a condition necessary for recognizing said input words consist only of non-disfluency words, if said inputted words have been judged to be non-disfluency words in said step (a);

(c) calculating a probability, if said conditional words have been judged as comprising non-disfluency words and disfluency words in said step (b), by using a dictionary containing a first language model which has been trained regarding disfluency words and non-disfluency words, and a second language model which has been trained regarding non-disfluency words and trained to ignore disfluency words so as to recognize words showing the highest probability of representing said input words;

calculating said probability based on said first language model, if said object words have been judged as not being non-disfluency words in said step (a); and calculating said probability based on said second language model, if said conditional words have been judged as consisting only of non-disfluency words in said step (c).

9. The method for speech recognition according to claim 8, said step (c) further comprising the steps of:

(d) judging whether a word immediately preceding said object word is a disfluency word; and calculating said probability based on said first and said second language models, if said preceding word has been judged to be a disfluency word in said step (d).

10. The method for speech recognition according to claim 9, further comprising the step of:

calculating said probability based on said second language model, if said preceding word has been judged as not being a disfluency word in said step (d).

11. A method for recognizing speech from texts comprising disfluency words and non-disfluency words, comprising the steps of:

(a) judging whether words inputted as an object of recognition are non-disfluency words;

(b) judging further whether said words constituting a condition necessary for recognizing said input words consist only of non-disfluency words, if said inputted words have been judged to be non-disfluency words in said step (a);

(c) calculating a probability, if said conditional words have been judged as comprising non-disfluency words and disfluency words in said step (b), by using a dictionary containing a first language model which has been trained regarding disfluency words and non-disfluency words, and a second language model which has been trained regarding non-disfluency words and trained to ignore disfluency words so as to recognize words showing the highest probability of representing said input words;

(d) judging whether a word immediately preceding said object word is a disfluency word; and calculating said probability based on said first and said second language models, if said preceding word has been judged to be a disfluency word in said step (d).

12. The method for speech recognition according to claim 11, further comprising the step of:

calculating said probability based on said second language model, if said preceding word has been judged as not being a disfluency word in said step (d).

13. The method for speech recognition according to claim 11, said step (c) further comprising the steps of:

calculating said probability based on said first language model, if said object words have been judged as not being non-disfluency words in said step (a).

14. The method for speech recognition according to claim 13, further comprising the step of:

calculating said probability based on said second language model, if said preceding word has been judged as not being a disfluency word in said step (d).

15. The method for speech recognition according to claim 13, said step (c) further comprising the steps of:

calculating said probability based on said second language model, if said conditional words have been judged as consisting only of non-disfluency words in said step (b).

16. The method for speech recognition according to claim 15, further comprising the step of:

calculating said probability based on said second language model, if said preceding word has been judged as not being a disfluency word in said step (d).

17. A storage medium readable by a computer containing a computer program to recognize speech from texts comprising disfluency words and non-disfluency words, said computer program being designed to make the computer perform the following steps:

(a) judging whether words inputted as an object of recognition are non-disfluency words;

(b) judging whether said words constituting a condition necessary for recognizing said inputted words consist only of non-disfluency words, if the inputted words have been judged to be non-disfluency words in said step (a);

(c) calculating a probability, if said conditional words have been judged as comprising non-disfluency words and disfluency words in said step (b), by using a dictionary containing a first language model which has been trained regarding disfluency words and non-disfluency words and a second language model which has been trained regarding non-disfluency words and trained to ignore disfluency words so as to recognize words showing the highest probability of representing said inputted words;

calculating said probability based on said first language model, if said object words have been judged as not being non-disfluency words in said step (a); and calculating said probability based on said second language model, if said conditional words have been judged as consisting only of non-disfluency words in said step (b).

18. The storage medium according to claim 17, wherein said computer program is designed to make the computer execute the additional steps of:

(d) judging whether a word immediately preceding said object word is a disfluency word; and calculating said probability based on said first and said second language models, if said preceding word has been judged to be a disfluency word in said step (d).

19. The storage medium according to claim 18, wherein said computer program is designed to make the computer execute the additional step of:

calculating said probability based on said second language model, if said preceding word has been judged as not being a disfluency word in said step (d).

20. A storage medium readable by a computer containing a computer program to recognize speech from texts comprising disfluency words and non-disfluency words, said computer program being designed to make the computer perform the following steps:

(a) judging whether words inputted as an object of recognition are non-disfluency words;

(b) judging further whether said words constituting a condition necessary for recognizing said inputted words consist only of non-disfluency words, if the inputted words have been judged to be non-disfluency words in said step (a);

(c) calculating a probability, if said conditional words have been judged as comprising non-disfluency words and disfluency words in said step (b), by using a dictionary containing a first language model which has been trained regarding disfluency words and non-disfluency words and a second language model which has been trained regarding non-disfluency words and trained to ignore disfluency words so as to recognize words showing the highest probability of representing said inputted words;

(d) judging whether a word immediately preceding said object word is a disfluency word; and calculating said probability based on said first and said second language models, if said preceding word has been judged to be a disfluency word in said step (d).

21. The storage medium according to claim 20, wherein said computer program is designed to make the computer execute the additional step of:

calculating said probability based on second language model, if said preceding word has been judged as not being a disfluency word in said step (d).

22. The storage medium according to claim 20, wherein said computer program is designed to make the computer execute the additional step of:

calculating said probability based on said first language model, if said object words have been judged as not being non-disfluency words in said step (a).

23. The storage medium according to claim 22, wherein said computer program is designed to make the computer execute the additional step of:

calculating said probability based on said second language model, if said preceding word has been judged as not being a disfluency word in said step (d).

24. The storage medium according to claim 22, wherein said computer program is designed to make the computer execute the additional steps of:

calculating said probability based on said second language model, if said conditional words have been judged as consisting only of non-disfluency words in said step (b).

25. The storage medium according to claim 24, wherein said computer program is designed to make the computer execute the additional step of:

calculating said probability based on said second language model, if said preceding word has been judged as not being a disfluency word in said step (d).

* * * * *